July 31, 1928.  1,679,321
R. F. McKAY
PIPE CUTTER
Filed March 7, 1927
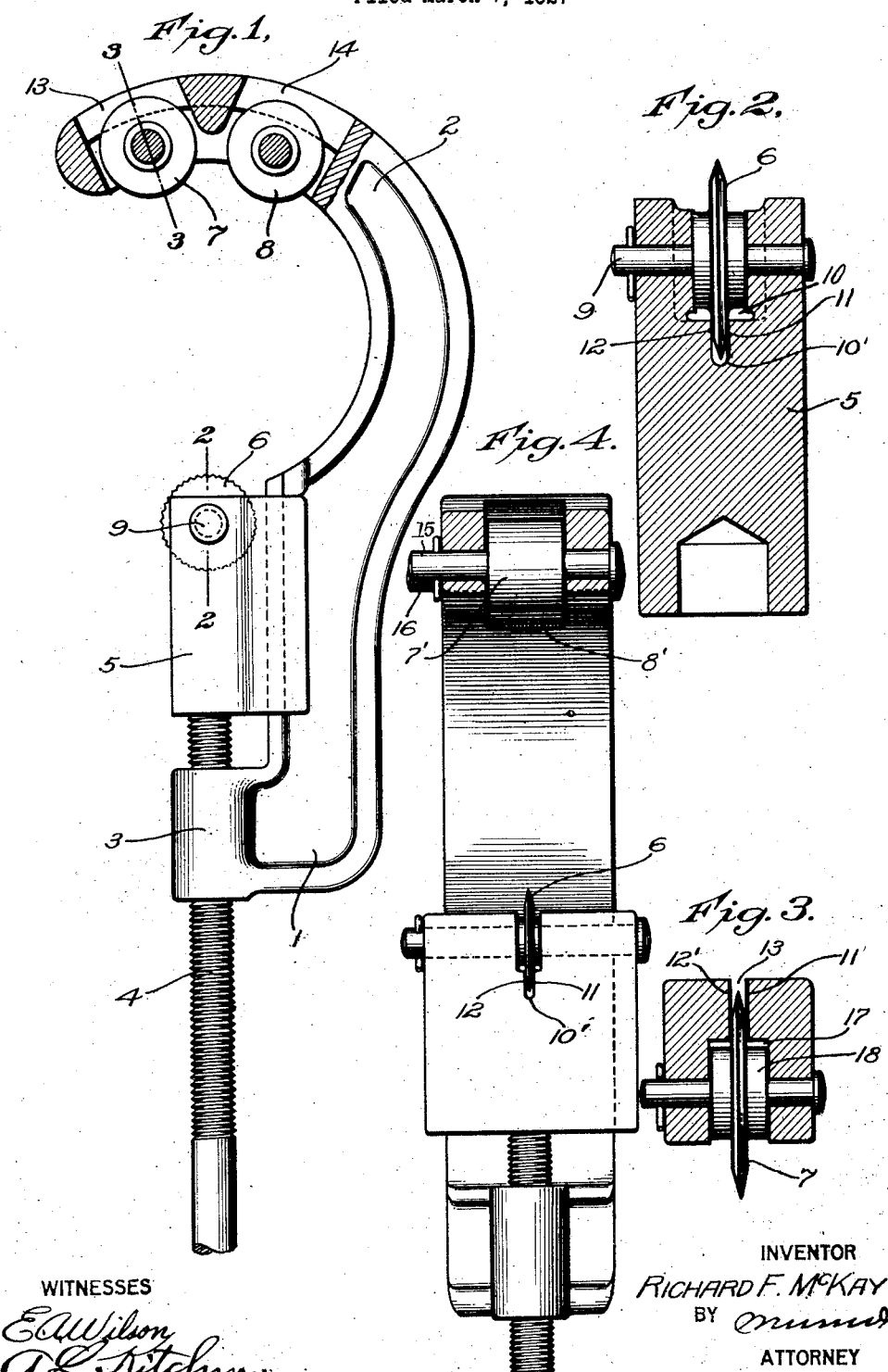
WITNESSES
INVENTOR
RICHARD F. McKAY
BY
ATTORNEY Patented July 31, 1928.

1,679,321

UNITED STATES PATENT OFFICE.

RICHARD FREDRICK McKAY, OF BROOKLYN, NEW YORK.

PIPE CUTTER.

Application filed March 7, 1927. Serial No. 173,525.

This invention relates to pipe cutters and has for an object to provide an improved construction wherein the various cutters are caused to travel in the same plane.

Another object of the invention is to provide a pipe cutter wherein one or more cutters may be used and guided so as to substantially accurately move in the path intended.

In the accompanying drawing—

Figure 1 is a side view of a cutter, disclosing an embodiment of the invention, certain parts of the cutter being broken away.

Figure 2 is an enlarged detail fragmentary sectional view through Figure 1 on line 2—2.

Figure 3 is an enlarged detail sectional view through Figure 1 on line 3—3.

Figure 4 is an edge view of a cutter similar to that shown in Figure 1 but disclosing a modified form of the invention.

Referring to the accompanying drawing by numerals, 1 indicates the body of the cutter, which body is formed with a hook end 2 and with an internally threaded tubular enlargement 3. A screw member 4 is fitted into the tubular member 3 with one end rotatably mounted in a sliding block 5. The block 5, body 1 and associated parts just described are old and well known and form part of the invention only in combination with the parts hereinafter fully described. Heretofore, it has been customary to provide cutters 6, 7 and 8 as shown in the drawing. Each of these cutters is mounted on a rotatable shaft 9 and are positioned to move in the same groove during the cutting operation.

Heretofore, by reason of the looseness of the parts and other contingencies, sometimes the different cutters would not fall in the same groove and in order to do so the workman would pull to one side the body 1 whereby it often happened that one or more of the cutters would become broken. To obviate this and to cause the cutters to follow in the same groove in the pipe being cut, a notch 10 is formed in the sliding block 5, said notch merging into a slot 10' having straight walls 11 and 12 which slidingly engage the sides of the cutter 6. In this way the cutter is held almost exactly in its true or correct position and prevented from wabbling. The cutters 7 and 8 are likewise guided by slots 13 and 14 formed with straight side walls similar to slot 10'. Aside from the guiding structure formed by the side walls of each of the slots 10', 13 and 14, the tool is formed the same as tools now on the market. Under some circumstances it is desirable to use only one cutter and when this is the case the structure shown in Figure 4 is utilized. In this form of the invention, there is provided rollers 7' and 8' which are supported by suitable shafts 15 and 16. These rollers are of appreciable width and roll easily on a pipe while the cutter 6 performs the usual operation of cutting. This cutter is guided by the side walls 11 and 12 whereby an accurate cutting operation is performed and the cutter is caused to always travel in the same groove. It is well known that most of the cutters do not wear out but break and become useless through being distorted in some manner. It will, therefore, be seen that by guiding the cutter as described, the guiding performs the function of increasing the life of the cutter.

As indicated in Figure 3, the side walls 11' and 12' of slot 13 extend from the outer part of the member 2 to the opening or notch 17 which receives the hub 18 of the cutter 7. The same structure is found in respect to cutter 8 and slot 14.

What I claim is:

A pipe cutter, comprising a body formed at its outer end with a pair of notches merging into slots and with a hollow internally threaded projection at its inner end, a slide mounted on said body adjacent said inner end, a handle having a threaded section extending through said threaded projection and positioned to adjust said slide, said slide having a notch merging into a slot, a cutter formed with a hub and blade positioned so that said hub will be in the notch in said slide while the blade will extend through the slot in the slide, a journal pin carried by said slide for rotatably supporting said cutter, a pair of cutters for the outer end of said body, said cutters being formed with hubs positioned in the respective notches in said outer end and with blades extending into the slots in said outer end, a journal pin for each of said last mentioned cutters carried by said outer end for rotatably supporting said last mentioned cutters, said last mentioned cutters being substantially in line with the cutter carried by said slide, the structure carrying the respective slots presenting walls frictionally engaging the sides of the respective blades for holding the blades in their correct operative positions.

RICHARD FREDRICK McKAY.